United States Patent Office.

JOHN MEEK PETIT, OF MONROE TOWNSHIP, OHIO.

Letters Patent No. 112,845, dated March 21, 1871.

IMPROVEMENT IN PREPARING SEED-CORN.

The Schedule referred to in these Letters Patent and making part of the same.

*To all whom it may concern:*

Be it known that I, JOHN MEEK PETIT, of Monroe Township, in the county of Adams and State of Ohio, have invented or discovered a new and useful Compound for Preserving Seed-Corn from Worms and Insects; and I do hereby declare that the following is a full and exact description of the same.

My invention or discovery consists of a new compound for protecting grain, especially corn, from worms and insects.

The ingredients comprising my compound and the manner of mixing them will be fully described hereinafter.

I take one quart of coal-tar or pine-tar and place it in a suitable vessel with a bushel of seed-corn or other grain. The latter is then thoroughly stirred until every kernel is well coated with the tar.

I then take half a pound of sulphur and a proper quantity of common lime, and mix the two thoroughly. I then stir the corn and sprinkle the mixture of sulphur and lime on it until the kernels are coated and dried. The grain is now ready for planting.

This compound not only serves to protect the seed from all kinds of insects and worms, but also preserves it from receiving injury from cold rains or damp weather, as its coating keeps it dry and prevents it from rotting.

The employment of the sulphur in connection with the lime produces an insoluble compound, which serves especially to hold the lime and prevent the seed from being affected by dampness.

I do not claim the employment of tar or lime in themselves, for these ingredients have long been used for similar purposes; but

Having thus fully described my discovery, and how it is compounded,

What I claim, and desire to secure by Letters Patent, is—

A compound for protecting seed-grain, composed of the three ingredients, tar, lime, and sulphur, applied as described, for the purpose set forth.

This specification signed and witnessed this 13th day of December, 1870.

JOHN M. PETIT.

Witnesses:
H. KENNEDY,
E. R. WELLS.